June 12, 1956 P. HAGEDORN 2,750,201
LOAD DISTRIBUTING WHEEL SUPPORTING UNDERCARRIAGE FOR VEHICLES
Filed Nov. 27, 1953
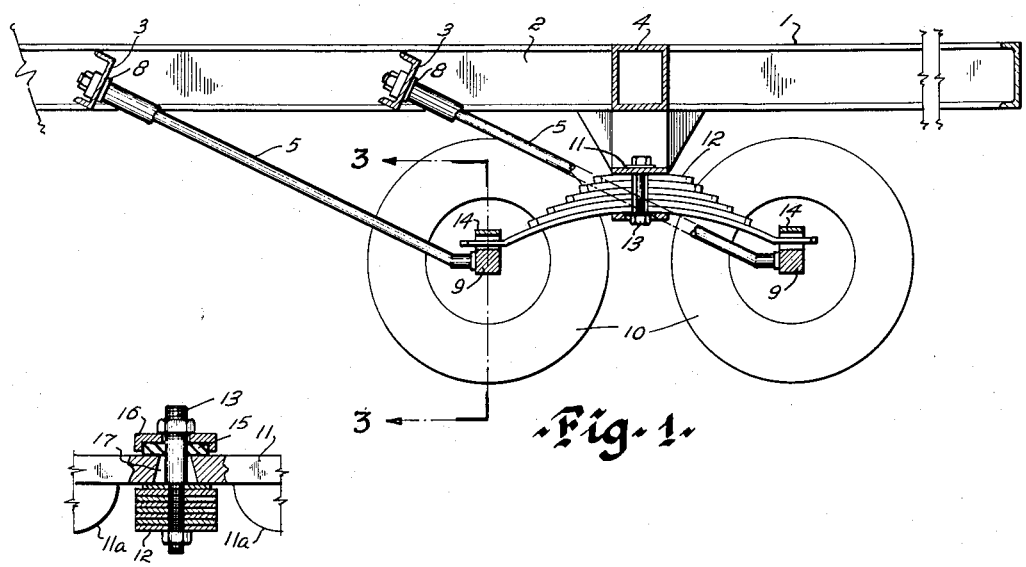
Fig. 1.
Fig. 4.
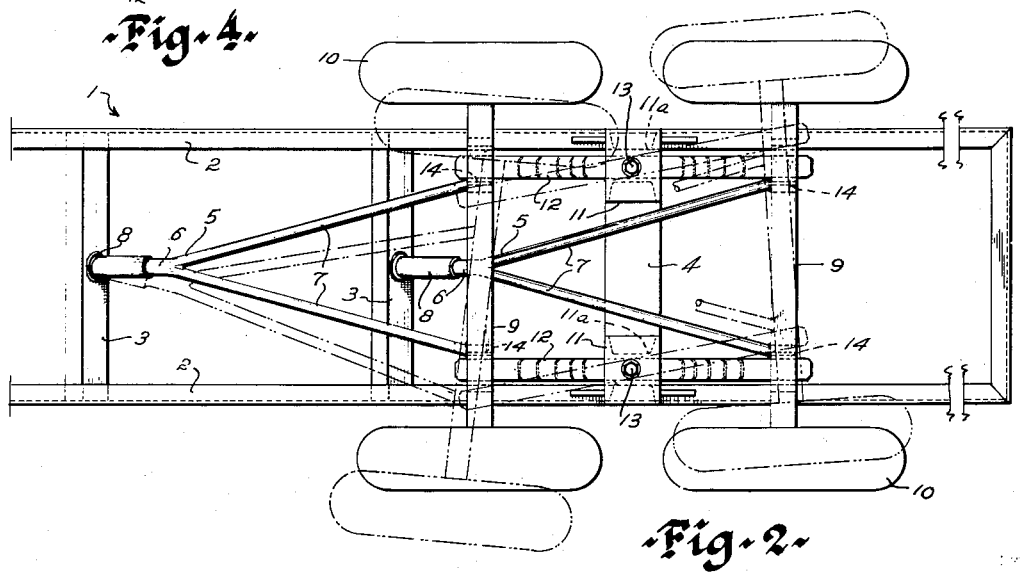
Fig. 2.
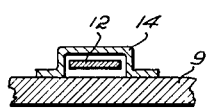
Fig. 3.
INVENTOR.
Paul Hagedorn
BY Alex. E. MacRae
Attorney.

United States Patent Office 2,750,201
Patented June 12, 1956

2,750,201

LOAD DISTRIBUTING WHEEL SUPPORTING UNDERCARRIAGE FOR VEHICLES

Paul Hagedorn, Yellowknife, Northwest Territories, Canada

Application November 27, 1953, Serial No. 394,815

4 Claims. (Cl. 280—104.5)

This invention relates to undercarriages for trailers, semi-trailers and the like.

It is an object of this invention to provide an undercarriage for vehicles such as trailers and the like which permits the wheels to ride over uneven surfaces without substantial elevation of the vehicle proper, and which renders the vehicle more manoeuvrable, whereby exceptionally smooth riding qualities are imparted to the vehicle, tire wear is reduced, and the tire changing is simplified.

The invention will be described with reference to the accompanying drawing, in which Figure 1 is a side elevation of the undercarriage in accordance with the invention, Figure 2 is a bottom plan view of the undercarriage, Figure 3 is a sectional end elevation of a detail of the undercarriage on line 3—3 of Figure 1, and Figure 4 is a sectional end elevation of a spring mounting, Referring to the drawing, the undercarriage comprises a frame 1, which may be metal channel construction and having two longitudinal lateral members 2, a transverse rear member 2a, two spaced inclined transverse members 3 adjacent the forward end of the frame, and a transverse beam 4 rearwardly of the members 3.

A Y-shaped or "wishbone" arm 5 is mounted on each transverse member 3. Each arm 5 has a relatively short root section 6, and a pair of relatively long sections 7 diverging from the section 6. The end of section 6 is connected to a member 3 centrally thereof by means of a conventional flexible or universal joint 8 or the like which permits both rotary and swinging motion of the arm 5 with respect to the member 3. Fixed rigidly to the ends of the sections 7 of each arm 5 is an axle 9 of a conventional wheel and axle set which includes the wheels 10.

A spring bracket 11 is suspended from each end of beam 4 and a spring 12 is pivotally mounted at its midsection, as by means of a pivot pin 13, in each bracket. It will be observed that bracket 11 permits limited horizontal swinging movement of the spring 12. The lower leaf of each spring has its ends connected to respective axles 9 by means of a slip joint 14.

The spring mounting also provides for slight movement of the spring assembly in a vertical plane parallel to the longitudinal direction of the spring leaves. Figure 4 illustrates one form of mounting in greater detail, by way of example. As shown, a hard rubber or like resilient pad 15, with keeper 16 therefor, is carried by the pivot pin 13 above the bracket 11. The opening 17 for the pin in the bracket is slightly oversize and tapered, as shown. It will be apparent that the spring assembly may thus tilt in a vertical plane. Such movement is to ensure that the load on the spring is at all times, the same through each axle. Hence, when one set of wheels is lifted, the spring set tilts and passes half the tension caused thereby to the other set of wheels.

Figure 2 illustrates, in dotted lines, the relative position of the various parts when the vehicle is negotiating a left turn. The resultant side thrust causes the forward wheel set to move towards the right (when viewed from the top) as permitted by the flexible joint 8, until the side thrust becomes negligible. Similarly, the rear wheel set moves to the left. The relative motion of the two wheel sets is controlled by the rotative movement of the springs 12, which movement is arrested on engagement of the spring with the side wall surfaces 11a of the brackets 11. The extent of such rotative movement from their normal parallel relation with the longitudinal axis of the vehicle may vary as required. A satisfactory extent of movement is 15°–20° from such parallel relation.

It will thus be apparent that the undercarriage of the present invention will provide improved manoeuvrability of the body supported thereby while imparting smooth riding qualities thereto with substantial elimination of stresses and strains. Moreover, the described spring suspension of the wheel and axle sets, as well as the swinging movement thereof provided, results in increased tire life and more convenient raising of the individual wheels for tire changing purposes.

I claim:

1. A vehicle undercarriage comprising: a frame having a pair of longitudinal members and a plurality of transverse members fixed to said longitudinal members, a pair of wheel and axle sets, an arm fixed to the axle of each said set, a flexible joint connecting each said arm to a respective one of said transverse members for rotative and swinging movement with respect thereto, a pair of spring supporting brackets suspended from another one of said transverse members, a spring pivotally mounted adjacent its mid-section in each bracket for generally horizontal rotative motion, each end of each spring having a slip joint connection with an axle of said wheel and axle sets.

2. A vehicle undercarriage as defined in claim 1, each said spring supporting bracket having side wall surfaces engageable by said spring to limit the rotative motion thereof.

3. A vehicle undercarriage comprising: a frame having a pair of longitudinal members, a pair of spaced, transverse members fixed to said longitudinal members adjacent the forward end of the frame, and a transverse beam fixed to said longitudinal members rearwardly of said transverse members, a pair of wheel and axle sets, an arm having a pair of diverging sections fixed to the axle of each said set and an end section, a flexible joint connecting each said end section to a respective one of said transverse members for rotative and swinging movement with respect thereto, a pair of spring supporting brackets suspended from said beam, a leaf spring pivotally mounted adjacent its midsection in each bracket for generally horizontal rotative motion, and a slip joint connecting each end of each said spring to a respective axle of said wheel and axle sets.

4. A vehicle undercarriage as defined in claim 3, including a pin extending through each said spring and bracket and constituting the pivotal mounting for said spring, and a resilient pad carried by the pin and engaging said bracket, said pad providing limited vertical movement of said spring with respect to said bracket.

References Cited in the file of this patent

UNITED STATES PATENTS

| | | |
|---|---|---|
| 1,743,892 | Hylton | Jan. 14, 1930 |
| 2,272,572 | Merry | Feb. 10, 1942 |